Jan. 7, 1941.  C. W. BODEN  2,227,875
TRAILER FOR ROAD VEHICLES
Filed July 8, 1938
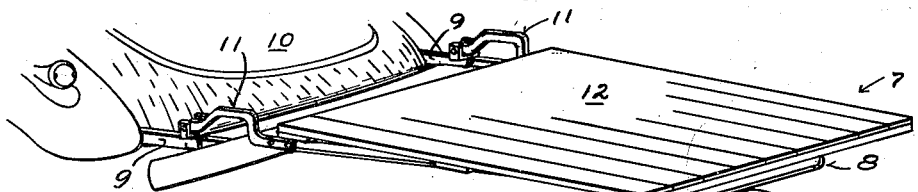
Fig. 1
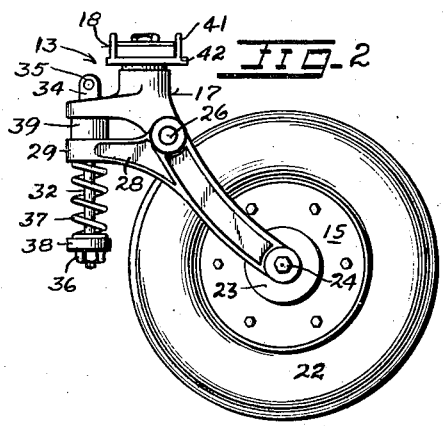
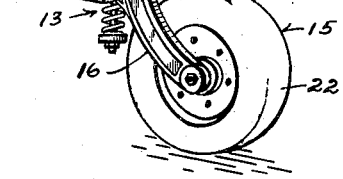
Fig. 3
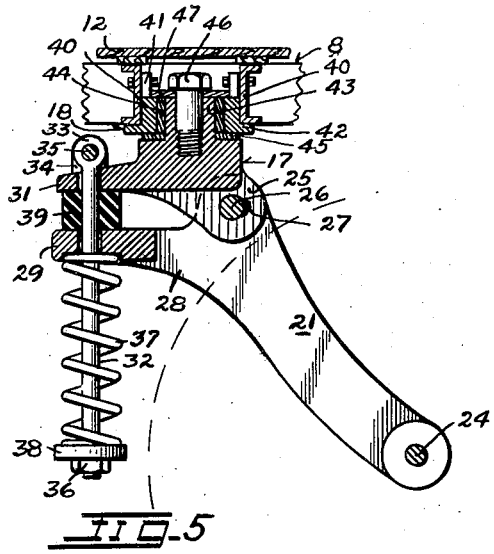
Fig. 5
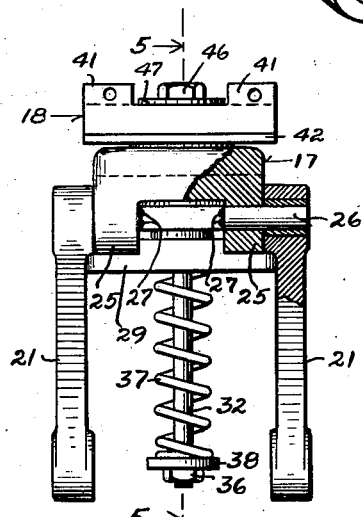
Fig. 4
INVENTOR.
CECIL W. BODEN
BY Henry N. Young
ATTORNEY Patented Jan. 7, 1941

2,227,875

UNITED STATES PATENT OFFICE 2,227,875

TRAILER FOR ROAD VEHICLES

Cecil W. Boden, Oakland, Calif.

Application July 8, 1938, Serial No. 218,173

3 Claims. (Cl. 16—44)

The invention concerns trailers for road vehicles, and more particularly relates to wheel devices for supporting such trailers from the road.

An object of the invention is to provide a generally improved trailer wheel unit of the caster type which will not weave or shimmy while travelling along a road at a high speed.

Another object is to provide a wheel caster having an improved shock absorbing means which is equally operative for all possible directions of travel of the wheel, and operates without undue slap or rebound effects.

A further object is to provide a wheel caster assembly of the character described which is of minimum thickness transversely of the wheel plane and is particularly simple in structure.

The invention possesses other objects and features of advantage, some of which, with the foregoing, will be set forth or be apparent in the following description of a typical embodiment thereof, and in the accompanying drawing, in which Figure 1 is a perspective view showing a trailer provided with a supporting wheel caster embodying the features of the present invention.

Figure 2 is a side elevation of the caster.

Figure 3 is a perspective view of a unitary fork member of the caster assembly.

Figure 4 is a rear view of the caster having its wheel removed and a portion of the structure broken out and shown in section.

Figure 5 is a sectional view at 5—5 in Figure 4.

As is particularly illustrated, the features of the present invention are incorporated in the structure of a trailer 7 which comprises a load-supporting frame 8 having its front end pivotally and supportedly secured to laterally spaced bumper-supporting bars 9, or other members, which extend rearwardly from the body of an automobile 10, or other motor driven vehicle for travel on the highways. The pivotal connection between the bars 9 and the frame 8 is provided by suitable hitch assemblies 11 which are cooperative to provide pivotal connections between the bars and side members of the frame 8, it being understood that the arrangement maintains the longitudinal alignment of the frame with the vehicle as an extension of the vehicle body to which it is hinged by the assemblies 11. A load-receiving platform or bed 12 is shown as being mounted on the frame 8, and represents any suitable body for the trailer.

As is usual with trailers which are arranged to move or swing laterally as part of the towing vehicle, the trailer load is preferably arranged to be supported mainly from the roadway and upon a wheel caster 14 having its swivelling axis upright and being fixed to and beneath the frame 8 toward its rear end and in its longitudinal center line whereby the two vehicle connections and the caster 14 cooperatively provide a three-point support for the trailer frame and its load. The arrangement is preferably such that the trailer frame 8 is substantially parallel to the plane of the supporting roadway thereat.

The present caster assembly 14 essentially comprises a wheel 15 rotatively mounted between the legs of a fork 16 which is hinged to a member 17 which is in turn swiveled to a base or bracket 18 fixed to the frame 8. The arrangement is such that the swiveling axis of the member 17 is perpendicular to the plane of the frame 8, and the axis of rotation of the wheel 15 and the axis of hinging of the fork 16 are mutually parallel to each other and said frame plane. Also, it is to be noted that, as is usual with trailer casters, the wheel axis is disposed rearwardly of the swivel axis as the caster wheel rolls forwardly along a supporting roadway; this is provided by having the common plane of the wheel and hinging axes of the fork oblique to the road plane, and results in the engagement of the wheel tread with the road at a point rearwardly of the intersection of the swivel axis with the road.

The legs 21 of the fork 16 are laterally spaced apart to freely receive the wheel 15 between them, said wheel being provided with a pneumatic tire 22 of suitable size. The wheel hub 23 is mounted on a shaft 24 which is engaged in and between the lower extremities of the fork legs 21. Mutually spaced and parallel ears 25 depend from the under side of the member 17 for the simultaneous disposal of their mutually opposite faces in close proximity to the opposed inner faces of the fork legs 21 at the upper ends thereof, and mutually aligned bores through the ears 25 and said upper fork ends receive a hinge pin 26 for hinging the fork and member 17 together for relative rotation about the pin axis. Preferably, and as indicated in Figure 4, the pin 26 is arranged for a tight fit in the ears 25 and may be spot-welded to the ears in set position as is shown at 27; in this manner, the fork is arranged for its pivotal movement about the ends of the pin 26 which is flush with the outer fork faces at its opposite ends whereby to minimize the necessary width of the assembly at the hinge pin. If desired, the bearing bores of the fork legs may be provided with bearing bushings, as is shown.

It will now be noted that the under face of the member 17 above the ears 25 is generally parallel to the frame 3 and extends forwardly from above the hinge pin 26, and that the fork legs 21 are integrally joined by a U-shaped fork portion which extends forwardly of the hinge pin 26 and around the ears 25. As shown, said leg-connecting fork portion comprises forward lateral extensions 28 of the fork legs 21 connected by a flat part 29 which extends in general parallelism to said under face of the member 17 and in spaced relation thereto.

The member 17 provides a forwardly extending arm 31 which lies opposite the arm provided by the fork portions 28 and 29, and said arms are provided with mutually aligned perforations therethrough which freely receive a bolt 32 which is disposed in generally perpendicular relation to the plane of the portion 29, and in the wheel plane. The upper bolt end is pivoted to the extension or arm 31; as shown, a terminal eye 33 of the bolt is disposed between upstanding ears 34 of the arm 31 and receives a pivot pin 35 which is fixed in and between said ears. At its lower end, the bolt 32 mounts a nut 36 between which and the under side of the fork portion 29 a compression spring 37 is engaged; as shown, a depression in the under face of the arm 29 and an upwardly flanged disc 38 engaging the upper face of the nut 36 provide centering seats for the spring extremities. A bumper ring 39 of rubber or the like encircles the bolt between the extension 31 and the fork portion 29 as a resilient means to yieldingly resist and limit the movement of the arms 29 and 31 toward each other; it will be understood that the arm 29 is normally held centered by and between the spring 37 and the spring ring 39 for its oscillation about the hinging axis of the fork, the bolt 32 being operative under tension.

With the described spring arrangement at and in connection with the bolt 32, it will be understood that when the forward-travelling wheel 15 strikes a projection in the road, the fork legs are temporarily swung upwardly and rearwardly against the increasing resistance of the spring 37, and that a return movement beyond the initial fork position is resisted by the bumper spring 39. The present provision of but one shock absorbing spring 37 and but one rebound absorbing spring 39 in mutually coaxial alignment and in the plane of the caster wheel provides a caster assembly of minimum width and also one in which road thrusts are confined to said plane and so cannot cause binding effects on the pin 26 or in the swivel connections.

It will now be noted that the base member 18 is generally rectangular for its fitted engagement between parallel cross-members 40 of the trailer frame 3, is provided with upstanding perforated ears 41 for use in bolting it to the members 40, and is provided with bottom side flanges 42 for seating against the under edges of the members 40 for carrying the weight of the trailer on the member 18. A cylindrical extension or stem 43 extends upwardly from the flat upper face of the member 17 and is journalled in a complementary upright bore provided through the base member 18. Preferably, and as shown, the stem-receiving bore of the base 18 is provided with a bearing bushing 44, and a bearing ring 45 is engaged between the opposed bottom and top faces of the base 18 and member 17. A cap-screw 46 is axially engaged in the stem 43 to releasably fix an overlying disc 47 thereto, said disc extending opposite the upper face of the base member to secure the stem in the base and complete the swiveled connection of the member 17 and 18.

Considering the described caster as a unit, it will be particularly noted that the upright swivel axis defined at the stem 43 is somewhat ahead of the horizontal hinging axis for the wheel-carrying fork of the assembly, and that this arrangement is operative to prevent a weaving or shimmying action of the wheel on the road. Also, the hinging of the fork 16 to the member 17 which is swiveled to the trailer frame provides a shock-absorbing arrangement which is equally operative for all possible directions of the caster wheel with respect to the trailer, since it turns with the wheel and is constantly operative in the wheel plane. When the trailer is loaded, the weight of the load on the caster will normally compress the spring 37 somewhat whereby the load will be resiliently supported in part on the spring 37, it being noted that the effective lever arm of the fork about the hinge pin 27 constantly exceeds the effective lever arm for the resistance offered by the spring 37, for the permitted range of relative movement for the arms 29 and 31, said effective lever arms being measured in a line perpendicular to the bolt 32 and passing through the hinge pin axis. The normal resistance of the spring 37 may, of course, be varied by adjusting the nut 36 on the bolt 32.

While the present caster has been particularly designed for use in trailer structures of a particular type, it will be obvious that it may be usable to advantage with other types of trailers or with other vehicles than trailers.

From the foregoing description, taken in connection with the accompanying drawing, the advantages of the caster of my invention will be readily understood by those skilled in the art to which the invention appertains. While I have described the principle of operation, together with an arrangement which I now consider to be a preferred embodiment thereof, I desire to have it understood that the embodiment shown is primarily illustrative, and that such changes may be made, when desired, as fall within the scope of the following claims.

1. In a wheel caster, a base, a trailing fork and wheel assembly, an intermediate member hinged to the fork and swiveled to the base at axes which are respectively parallel to the wheel axis and upright, mutually spaced arms extending forwardly from the member and fork respectively in a common upright plane including the swivel axis, a bolt pivoted to a said arm and extending freely through the other arm in the plane of the arms, a compression spring means operative at the bolt and between the free bolt end and the second arm, and a compression spring means operative at the bolt and between said arms.

2. A structure in accordance with claim 1 wherein the arms and bolt are coplanar with the wheel, and the bolt is pivoted to the arm of the intermediate member.

3. A structure in accordance with claim 1 wherein the bolt is coplanar with the wheel and the hinging axis is rearward of the swivel axis.

CECIL W. BODEN.